United States Patent
Holzem et al.

(10) Patent No.: US 9,003,746 B2
(45) Date of Patent: Apr. 14, 2015

(54) SEALING TOOL

(75) Inventors: Dieter Holzem, Erolzheim (DE); Hubert Zeller, Ottobeuren (DE)

(73) Assignee: Multivac Sepp Haggenmuller GmbH & Co. KG, Wolfertschwenden (DE)

( * ) Notice: Subject to any disclaimer, the term of this patent is extended or adjusted under 35 U.S.C. 154(b) by 1127 days.

(21) Appl. No.: 13/007,101

(22) Filed: Jan. 14, 2011

(65) Prior Publication Data

US 2011/0167762 A1 Jul. 14, 2011

(30) Foreign Application Priority Data

Jan. 14, 2010 (DE) .......................... 10 2010 004 635

(51) Int. Cl.
| | |
|---|---|
| B65B 51/14 | (2006.01) |
| B65B 31/02 | (2006.01) |
| B29C 65/18 | (2006.01) |
| B29C 65/00 | (2006.01) |
| B65B 7/16 | (2006.01) |

(Continued)

(52) U.S. Cl.
CPC .............. B65B 31/028 (2013.01); B29C 65/18 (2013.01); B29C 66/8227 (2013.01); B29C 66/8242 (2013.01); B29C 66/82421 (2013.01); B29C 66/82423 (2013.01); B65B 7/164 (2013.01); B65B 51/14 (2013.01); B29C 66/8181 (2013.01); B29C 66/53461 (2013.01); B29C 66/81427 (2013.01); B29C 66/81431 (2013.01); B29C 66/849 (2013.01); B29C 66/876 (2013.01); B29L 2031/7162 (2013.01)
USPC .............. 53/329.3; 53/329; 53/329.2; 53/485

(58) Field of Classification Search
CPC .............. B29C 65/7841; B29C 66/131; B29C 66/53461; B29C 66/7841; B29C 66/83; B29C 66/8322
USPC .......................................... 53/329, 329.2, 485
See application file for complete search history.

(56) References Cited

U.S. PATENT DOCUMENTS

| | | | | |
|---|---|---|---|---|
| 711,210 | A | * | 10/1902 | Honiss .............................. 53/105 |
| 2,230,595 | A | * | 2/1941 | Horton .......................... 417/480 |
| 3,590,554 | A | * | 7/1971 | Carter ................................ 53/69 |

(Continued)

FOREIGN PATENT DOCUMENTS

| | | |
|---|---|---|
| DE | 34 04 451 A1 | 8/1985 |
| DE | 199 35 623 A1 | 2/2001 |

(Continued)

OTHER PUBLICATIONS

Extended German Search Report Dated Apr. 6, 2011, Applicant Multivac Sepp Haggenmueller GmbH & Co. KG, Application No. 11000166.6-2307, 6 Pages.

(Continued)

*Primary Examiner* — Gloria R Weeks
(74) *Attorney, Agent, or Firm* — Husch Blackwell LLP

(57) ABSTRACT

A sealing tool for a packaging machine comprises a sealing tool outer part, a sealing tool inner part that is movable in the sealing tool outer part, and a seal provided between the sealing tool outer part and the sealing tool inner part. The has a planar and annular design and is fixed in a first holding region at the sealing tool outer part as well as in a second holding region at the sealing tool inner part. The second holding region is disposed at or in the proximity of an outer edge of the sealing tool inner part.

13 Claims, 5 Drawing Sheets

(51) Int. Cl.
   *B65B 7/28* (2006.01)
   *B29L 31/00* (2006.01)

(56) References Cited

U.S. PATENT DOCUMENTS

| | | | | |
|---|---|---|---|---|
| 3,724,161 | A | * | 4/1973 | Vermeulen ................. 53/488 |
| 3,792,566 | A | * | 2/1974 | Kinney ..................... 53/298 |
| 3,792,567 | A | * | 2/1974 | Balcome ................... 53/329 |
| 3,800,502 | A | * | 4/1974 | Vermeulen ................ 53/329.2 |
| 3,884,017 | A | * | 5/1975 | Butcher ................... 53/296 |
| 4,154,044 | A | * | 5/1979 | Lang ....................... 53/97 |
| 4,282,699 | A | * | 8/1981 | Embro, Jr. ................ 53/298 |
| 4,669,369 | A | * | 6/1987 | Holt et al. ............... 92/160 |
| 4,909,022 | A | * | 3/1990 | Kubis et al. .............. 53/510 |
| 4,982,555 | A | * | 1/1991 | Ingemann .................. 53/405 |
| 4,989,393 | A | * | 2/1991 | Sell et al. ............... 53/299 |
| 4,991,375 | A | * | 2/1991 | Raque et al. .............. 53/329 |
| 5,056,427 | A | * | 10/1991 | Sakabe et al. ............ 100/211 |
| 5,155,974 | A | * | 10/1992 | Garwood ................... 53/510 |
| 5,230,205 | A | * | 7/1993 | Hautemont ................. 53/485 |
| 5,261,677 | A | * | 11/1993 | Gotoh et al. .............. 277/438 |
| 5,689,937 | A | * | 11/1997 | Gorlich et al. ............ 53/433 |
| 6,009,691 | A | * | 1/2000 | Lifshey ................... 53/478 |
| 6,351,928 | B2 | * | 3/2002 | Torre ..................... 53/556 |
| 7,121,402 | B2 | * | 10/2006 | Van Heerden et al. ....... 206/222 |
| 2003/0196412 | A1 | * | 10/2003 | Foulke, Jr. ............... 53/432 |
| 2004/0206048 | A1 | * | 10/2004 | Iuchi et al. .............. 53/329.2 |
| 2005/0257501 | A1 | * | 11/2005 | Natterer .................. 53/432 |
| 2009/0272076 | A1 | | 11/2009 | Biechteler |
| 2010/0024360 | A1 | * | 2/2010 | Ehrmann et al. ............ 53/285 |
| 2010/0287881 | A1 | * | 11/2010 | Ehrmann et al. ............ 53/170 |
| 2011/0167762 | A1 | * | 7/2011 | Holzem et al. ............. 53/329 |
| 2012/0324835 | A1 | * | 12/2012 | Ickert et al. ............. 53/476 |
| 2014/0000217 | A1 | * | 1/2014 | Granili ................... 53/329.2 |
| 2014/0116002 | A1 | * | 5/2014 | Denny et al. .............. 53/329.2 |

FOREIGN PATENT DOCUMENTS

| | | |
|---|---|---|
| DE | 10 2008 020 234 A1 | 10/2009 |
| EP | 2 112 070 A2 | 10/2009 |

OTHER PUBLICATIONS

German Search Report Dated Dec. 7, 2010, Applicant Multivac Sepp Haggenmueller GmBH & Co., Application No. 10 2010 004 635.3-27, 2 Pages.

* cited by examiner

SEALING TOOL

CROSS-REFERENCE TO RELATED APPLICATIONS

This application claims foreign priority benefits under 35 U.S.C. §119(a)-(d) to German patent application number DE 102010004635.3, filed Jan. 14, 2010, which is incorporated by reference in its entirety.

TECHNICAL FIELD

The present disclosure relates to a sealing tool for a packaging machine.

BACKGROUND

With such sealing tools, for example in deep-drawing packaging machines or tray sealing machines ("tray sealers"), packages are hermetically closed and sealed. To extend the storage life of the packaged products, the package can be optionally closed under a modified atmosphere, where the air in the package is evacuated or at least partially replaced by an exchange gas.

In most cases, a sealing plate is provided as a sealing tool inner part which is in connection with a heating plate or another heating means to be heated to the desired sealing temperature. The sealing plate, i.e. the sealing tool inner part, is movable in the vertical direction to be lowered onto the package and pressed against the package. If compressed air at a sufficiently high pressure is available, for example with at least 6 bar, the sealing plate is driven by means of pneumatic cylinders or inflatable hoses which are located on the upper side of the sealing plate and are filled with compressed air.

However, if no compressed air supply or a compressed air supply at a maximum overpressure of only 1 bar with respect to normal pressure is available, for example from a vacuum pump in compressor operation, no sufficient sealing pressure can be achieved any more with such a drive. Even if the sealing chamber is evacuated, the maximum pressure difference in this case is only 2 bar.

For such cases of a compressed air supply with insufficient pressure, according to the formula "force=pressure X area", it makes sense to increase the area subjected to pressure to achieve sufficiently high sealing forces. To this end, either the complete surface of the sealing plate can be subjected to pressure, or the sealing plate is rigidly connected to a piston plate disposed outside the actual sealing chamber. In this case, the pressure acts on the piston plate, and the piston plate can be considered as the movable sealing tool inner part whose movement is transmitted to the actual sealing plate.

If the upper side of the complete sealing plate or a piston plate is subjected to pressure and is to be moved thereby, sufficient sealing is required during the complete movement. For this purpose, it is known to insert a flexible O-ring seal into the gap between the sealing tool outer part and the movable sealing tool inner part. As an alternative to this, a membrane can be provided (except for optionally small recesses for passing through lines), whose surface is larger than the surface of the sealing plate or of the piston plate and which is clamped outside the sealing tool inner part all around the sealing tool outer part. If this large-surface membrane is subjected to pressure from above, it will lie against the sealing plate or the piston plate, respectively, and presses the latter downwards.

However, such a membrane has a disadvantage in that it is highly stressed and has to be replaced frequently, resulting in a standstill of the sealing tool, and thus in the worst case also of the complete packaging machine.

SUMMARY

It is an object of the present disclosure to provide a sealing tool which requires a minimum of maintenance and still achieves a sufficient sealing area with a sealing pressure of for example 150 N/cm$^2$ even with very low pressure differences.

The present disclosure provides for a seal between a sealing tool outer part and a sealing tool inner part to be configured as a planar, annular seal and to be fixed in a first holding region at the sealing tool outer part as well as in a second holding region at the sealing tool inner part. Moreover, the second holding region is disposed at the sealing tool inner part at or in the proximity of an outer edge of the sealing tool inner part. By these features, the sealing tool according to the present disclosure may offer various advantages:

Compared to a seal spanning the complete surface of the sealing tool inner part, the required material for an only annular seal is reduced.

Also compared to a membrane seal spanning the complete sealing tool inner part, efficiency is increased because the pressure can act directly onto the surface of the sealing tool inner part without having to first press the membrane against the sealing tool inner part.

Nearly the complete surface of the sealing tool inner part is available for a connection to lines, heating or cooling ducts. High stress on the material of the seal or the membrane in the region of the passages of these lines or ducts is avoided as the seal is mounted remote from these lines or ducts, that is at or in the proximity of the outer edge of the sealing tool inner part.

If the seal has a shape congruent to the run of the outer contour of the sealing tool inner part, the forces acting on the seal are distributed particularly uniformly, so that the maintenance or operation intervals of the seal are clearly extended.

It is advantageous for the seal to be extendable starting from an unstressed condition, as in this manner, it can be particularly well adapted to the movement of the sealing tool inner part and can always ensure sufficient sealing.

Preferably, the seal comprises silicone, or it altogether consists of silicone.

It is convenient for the seal to have a constant width. This also supports a uniform distribution of the forces acting on the seal, so that points of excessive stress are avoided.

Between the sealing tool outer part and the sealing tool inner part, preferably a gap with a certain gap width is provided, and the first and the second holding region for the seal are further apart than the gap width in a projection on a plane perpendicular to the direction of motion of the sealing tool inner part. With the same amplitude of motion of the sealing tool inner part, the angle at which the seal is located in the two end positions of the sealing tool inner part is reduced, and tensile stresses in the seal are reduced. In this manner, the service life of a seal is further increased.

It is conceivable that there is a gap between the sealing tool outer part and the sealing tool inner part, and that the first holding region is offset to the outside with respect to the outer edge of the gap. In addition or as an alternative, the second holding region could be offset to the inside with respect to the inner edge of the gap on the sealing tool inner part. Both measures result in the width of the seal being clearly larger than the width of the gap, so that the tensile stresses on the seal are reduced.

Preferably, a bevel or stepping is provided at least between one of the two holding regions and the gap. It takes care that during the movement of the sealing tool inner part, the seal is not deflected directly at the gap, but at a point spaced apart from the gap to prevent an excessive stress of the seal.

It is particularly advantageous if in an end position of the sealing tool inner part, a surface of the sealing tool inner part extends continuously with the surface of the bevel or stepping at the other side of the gap. This offers the advantage that the seal will lie against the two surfaces on both sides of the gap and can cross the gap continuously, i.e. without any bend. Thereby, excessive stress and a resulting weakness of the seal at the gap are prevented.

In addition or as an alternative, it would be conceivable that the seal remains spaced apart from the bevel or stepping in each position during the movement of the sealing tool inner part to be able to cross the gap continuously and without any bend in this manner, too.

Between at least one of the two holding regions and the gap, an edge with a rounding over which the seal can lie during the movement of the sealing tool inner part can be provided. By this, the formation of a bend in the seal is prevented.

An embodiment in which several interconnected piston plates, which are connected or arranged in series, are used together as drive for a sealing plate is also conceivable. The sealing pressure approximately multiplies with the number of piston plates.

Finally, the present disclosure relates not only to a sealing tool alone, but also to a packaging machine with such a sealing tool.

Below, embodiments of the present disclosure will be illustrated more in detail with reference to the below drawings.

DETAILED DESCRIPTION

Figure 1:
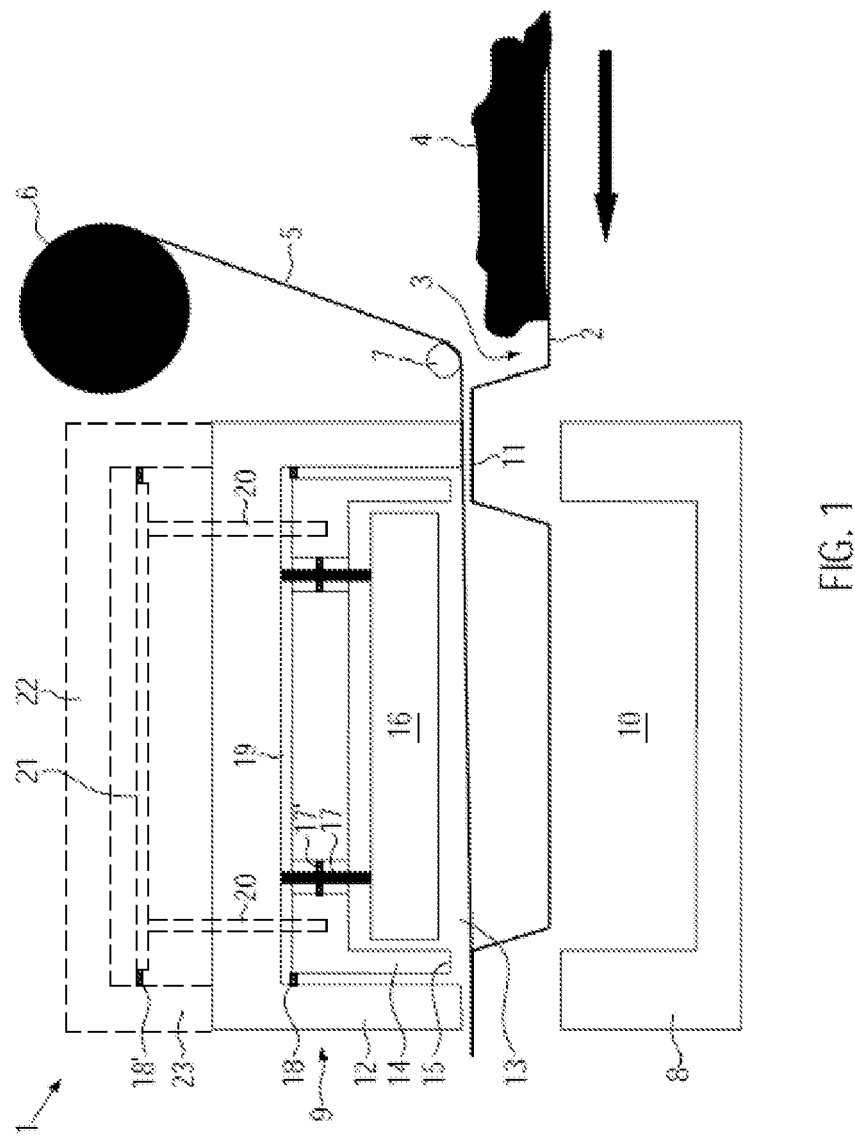
FIG. 1 shows a schematic vertical section through a sealing tool according to the present disclosure.

FIG. 1 shows a vertical section through an embodiment of a sealing tool 1 according to the present disclosure in an opened position. In the present embodiment, this sealing tool 1 is integrated in a deep-drawing packaging machine. In the packaging machine, troughs 3 are formed in a bottom film 2 by deep-drawing, the troughs then being filled with a product 4. In the sealing tool, the troughs 2 are then to be closed with a lid film 5 placed onto their edges to form sealed packages. The lid film 5 is drawn off from a roller 6 and fed to the sealing tool 1 via deflection rollers 7.

The sealing tool 1 has a bottom part 8 and an upper part 9. The bottom part 8 of the sealing tool 1 has a seat that is large enough to accommodate a trough 2. The edges 11 of the package trough 2 can here rest on the edges of the sealing tool bottom part 8. The upper part 9 of the sealing tool has a sealing tool outer part 12 which can open and close a sealing chamber 13 together with the sealing tool bottom part 8. Relative to the sealing tool outer part 12, a sealing tool inner part 14 is provided in its interior. The actual sealing edge 15 is located at the surrounding lower edge of the sealing tool inner part 14. If this sealing edge 15 is lowered onto the package and pressed against the package, along the contour of the sealing edge 15, the lid film 5 is sealed with the bottom film 2.

A cooling or product protection plate 16 is located inside the sealing tool inner part 14. A cooling medium flows through it via cooling ducts 17, so that it is cooler than the heated sealing plate 14. In this manner, sensitive products 4 can be protected from the heat of the sealing plate 14 during sealing. The cooling ducts 17 are sealed against the sealing plate 14 via seals 17'. Instead of the cooling ducts 17, heat removing bolts can also be provided.

In the first embodiment, the sealing plate or the sealing tool inner part 14, respectively, is vertically movable within the sealing tool outer part 12. A seal 18 extends annularly between the upper side of the sealing plate 14 and the sealing tool outer part 12. This seal is made as a planar, annular part of silicone. Its outer edge is fixed to the sealing tool outer part 12, while its inner edge is fixed to the sealing tool inner part 14. The space 19 above the sealing tool inner part 14, i.e. between the sealing tool outer part 12 and the sealing tool inner part 14, can be subjected to compressed air. This compressed air acts on the sealing tool inner part 14 and moves the latter downwards relative to the sealing tool outer part 12.

A second, alternative embodiment of the sealing tool 1 is also indicated in FIG. 1. In this alternative embodiment, the seal 18 between the sealing plate 14 and the sealing tool outer part 12 is missing. Instead, the sealing plate 14 is connected via a rigid connection (for example via bolts) 20 to a piston means or piston plate 21 which is movably held in a piston chamber 22 additionally provided above the sealing chamber 13. The walls 23 of this additional piston chamber 22 now form the sealing tool outer part 12, while the piston plate 21 forms the movable sealing tool inner part.

In this second embodiment, the seal 18' is provided between the outer walls 23 of the piston chamber 22 and the piston plate 21. This seal 18', which can also be embodied as a flat silicone ring, is fixed at its outer side at the walls 23 of the piston chamber 22, while its inner edge is fixed at or in the proximity of the outer edge of the piston plate 21. The region of the piston chamber 22 above the piston plate 21 can be subjected to compressed air to press the piston plate downwards. Due to the connection 20, the sealing plate 14 follows this movement of the piston plate 21 to be pressed against the container to be closed.

Figure 2:
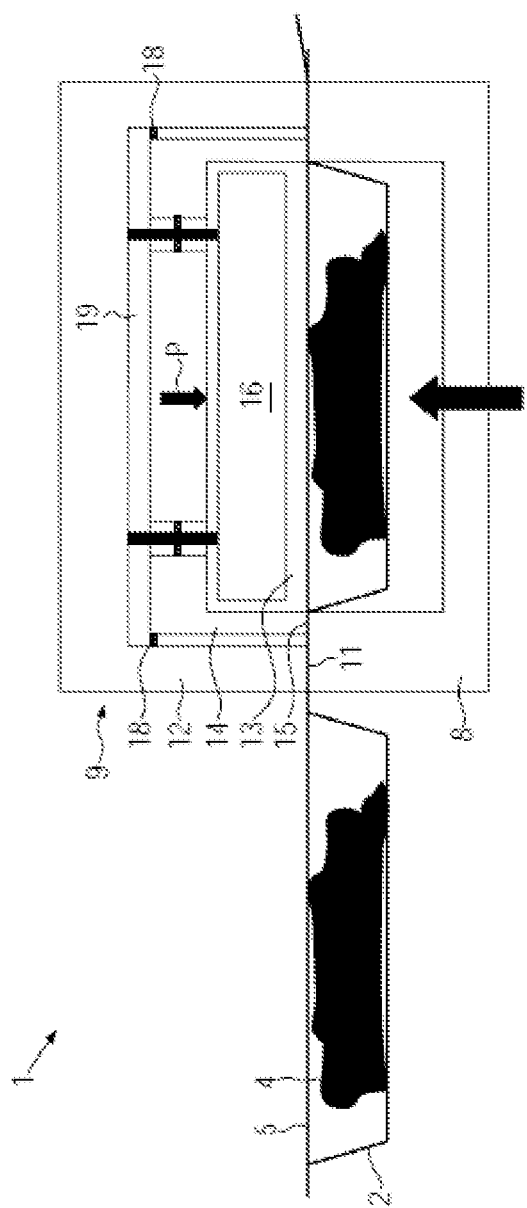
FIG. 2 shows a vertical section through the sealing tool shown in FIG. 1, which is closed now.

FIG. 2 shows the sealing tool 1 during the sealing operation itself. To this end, the sealing chamber 13 has first been closed by lifting the sealing tool bottom part 8 and placing it from the bottom against the edge 11 of the package trough 2. Simultaneously, the sealing tool upper part 9 has been lowered to clamp the edge 11 of the packages as well as the lid film 5 between itself and the sealing tool bottom part 8.

In the next step—as indicated by arrow P—the sealing tool inner part 14 has been lowered by filling the space 19 above the sealing plate 14 with compressed air. In this manner, the heated sealing edge 15 is placed against the packages and the required sealing pressure is simultaneously built up to seal the upper film 5 with the bottom film 2.

Figure 3:
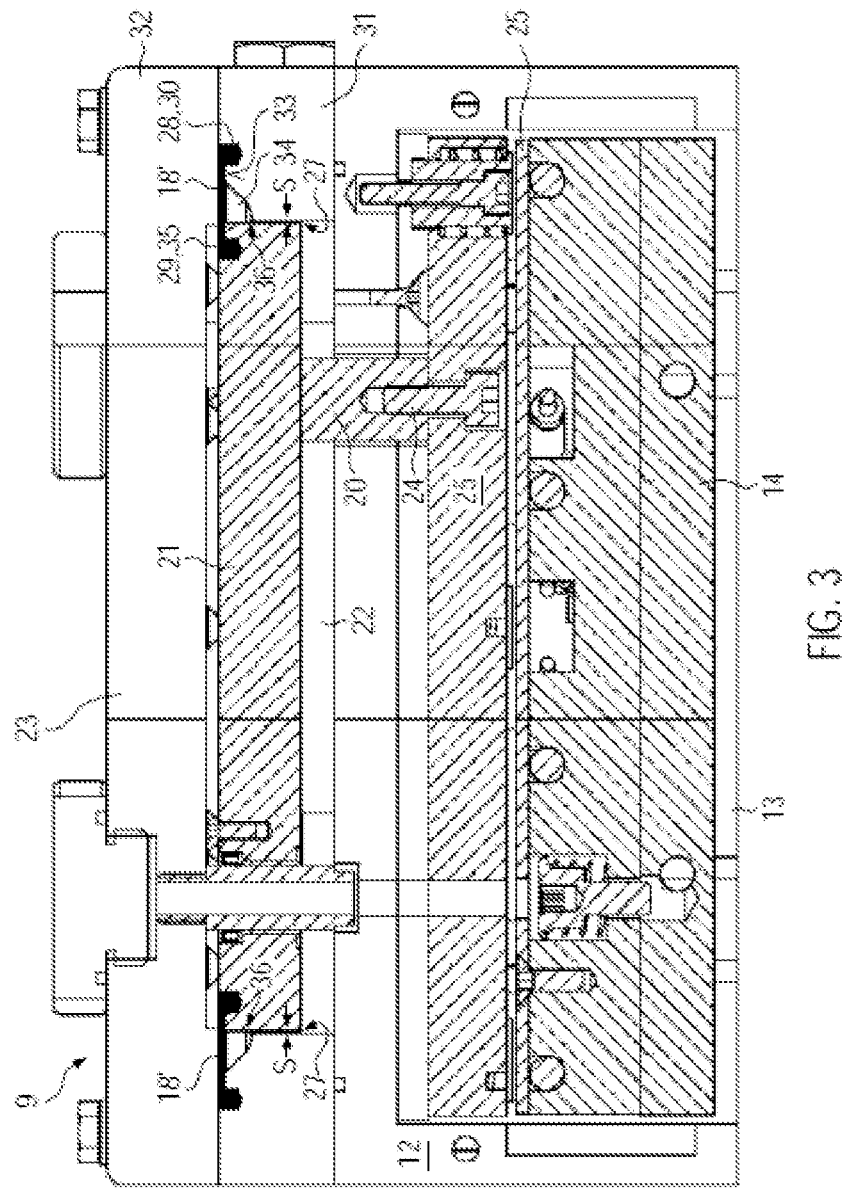
FIG. 3 shows a vertical section through a sealing plate connected with a piston plate in a lifted position.

FIG. 3 shows the second embodiment of the sealing tool upper part 9 in an enlargement where the sealing plate 14 is rigidly connected to a piston plate 21 via bolts. These bolts 20 are screwed to a multi-piece heatable heating plate 25 via screws 24, the heating plate itself being firmly connected to the sealing plate 14. A plane contact between the heating plate 25 and the sealing plate 14 ensures high heat conduction from the heating plate 25 to the sealing plate 14.

The piston plate 21 is located in a piston chamber 22 above the sealing chamber 13. Between the sides of the piston plate 21 and the walls 23 of the piston chamber 22, there is a gap 27 with a minimum width S just permitting the movement of the piston plate 21. Above the gap 27, the plane annular seal 18' connects the piston plate 21 (as sealing tool inner part) and the wall 23 of the piston chamber 22 (as sealing tool outer part).

The seal 18' has an outer bulge 28 and an inner bulge 29 which are each thicker than the central region of the seal 18'. The outer bulge 28 of the seal 18' is accommodated in a first holding region 30 in the wall 23 of the piston chamber 22. This first holding region 30 is embodied as a groove opened to the top in a lower piece 31 of the wall 23 which is sealed by an upper cover plate 32 after the seal 18' has been inserted to fix the outer bulge 28 of the seal 18'. Between a rounded edge 33 of the lower wall piece 31 and the cover plate 32, just enough space remains for receiving the central section of the seal 18'. Between this rounded edge 33 and the contour of the lower wall piece 31 facing inwards, a bevel or step 34 is provided which is spanned by the central section of the seal 18' in the position according to FIG. 3.

The inner bulge 29 of the seal 18' is fixed in a second holding region 35 which is embodied as a groove in the upper side of the piston plate 21. In particular, the second holding region 35 is disposed at or (in the represented embodiment) in the proximity of the outer edge or the outer contour 36 of the sealing tool inner part 14, 21. "In the proximity of the outer edge" in this context means that the center of the second holding region 35 is not further apart from the outer edge 36 than for example two to four times the thickness of the inner bulge 29, or than five to ten times the thickness of the central region of the seal 18'.

Figure 4:
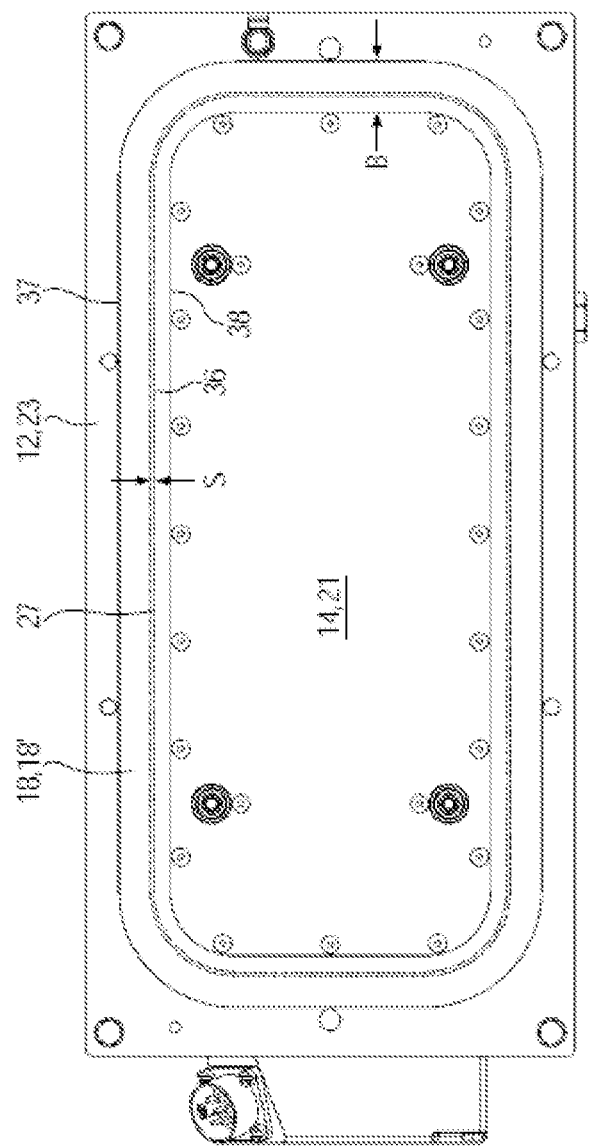
FIG. 4 shows a plan view onto the piston plate and seal shown in FIG. 3.

FIG. 4 shows a plan view of the sealing tool upper part 9 shown in FIG. 3 after the cover plate 32 has been removed. In the center, the sealing tool inner part 14, 21 which is approximately rectangular, but provided with rounded corners, can be seen (i.e. the sealing plate or the piston plate). The sealing tool inner part 14, 21 is separated from the sealing tool outer part 12, 23 (i.e. the outer wall of the sealing chamber 13 or the piston chamber 22, respectively) by the gap 27 having a constant width S.

The gap 27 is bridged by the seal 18, 18' whose annular run can be particularly well seen here. One can moreover see that the outer edge 37 as well as the inner edge 38 of the annular seal 18, 18' are in the plan view congruent to the run of the gap 27, or to the outer edge or outer contour 36 of the sealing tool inner part 14, 21. The width B of the seal 18, 18' is clearly greater than the width S of the gap 27.

Figure 5:
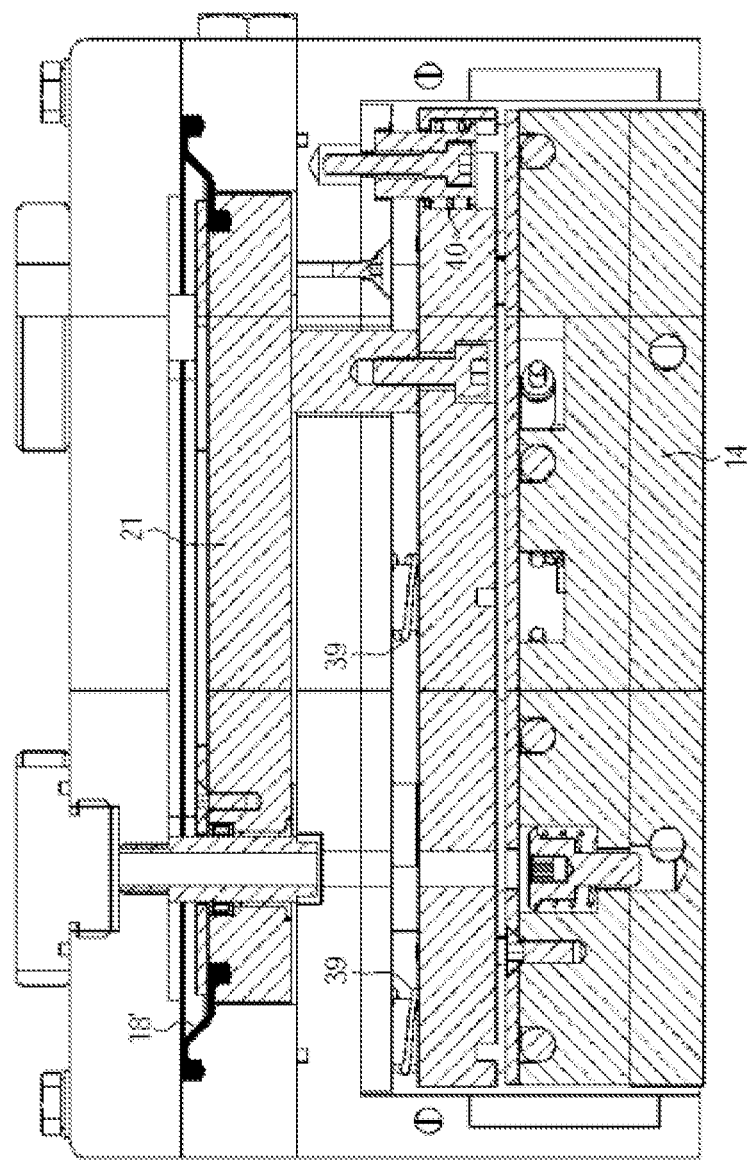
FIG. 5 shows a vertical section through the sealing plate and the piston plate according to FIG. 3 in a lowered position of the sealing plate.

FIG. 5 shows the sealing tool upper part 9 represented in FIG. 3, now, however, in a lowered position of the piston plate 21 and the sealing plate 14. This lowering is accomplished by introducing compressed air into the space of the piston chamber 22 above the piston plate 21 via non-depicted ducts, and by generating a vacuum in the sealing chamber 13. The pressure difference between the vacuum in the sealing chamber 13 and the overpressure in the piston chamber 22 can be, for example, 1 or 2 bar. This pressure difference leads to the piston plate 21 moving downwards together with the sealing plate 14.

In the process, the seal 18' is expanded. By the increased pressure prevailing above the seal 18', it will lie against the surface of the bevel or step 34. This surface has a stretched, S-shaped run. This run takes care that in the lowered position of the piston plate 21 shown in FIG. 5, the upper side of the piston plate 21 forms, together with the surface of the bevel 34, a continuous run without steps. The seal 18' can lie against these surfaces without an edge or a bend being obtained at the gap 27. In this manner, the expansion of the seal 18' is distributed uniformly across its complete central region between the two holding regions 30, 35, so that local, excessive stresses are prevented.

Via tension springs 39 and/or pressure springs 40, the sealing tool inner part 14 is suspended at the sealing tool outer part 12. As soon as the pressure difference between the sealing chamber 13 and the piston chamber 22 has been reduced, for example by venting the sealing chamber 13 and the piston chamber 22, the springs 39, 40 return the sealing plate 14 and (if provided) the piston plate 21 to the lifted starting position.

Starting from the represented embodiments, the sealing tool 1 according to the present disclosure can be modified in many ways. For example, it is possible not to accommodate the piston plate 21 in a separate piston chamber 22, but in the upper region of the sealing chamber 13 itself. The relative dimensions of the seal 18, 18', in particular the ratio of the thickness of the two bulges 28, 29 to the central region, can differ from the represented embodiment.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sealing tool for a packaging machine, the sealing tool comprising:
    a sealing tool outer part;
    a sealing tool inner part that is movable in the sealing tool outer part; and
    a seal provided between the sealing tool outer part and the sealing tool inner part, the seal having a flat, annular shape and being fixed in a first holding region at the sealing tool outer part and a second holding region at the sealing tool inner part, the second holding region being disposed at or in the proximity of an outer edge of the sealing tool inner part;
    wherein a gap with a gap width is provided between the sealing tool outer part and the sealing tool inner part, and the first holding region and the second holding region are spaced further apart than the gap width in a projection on a plane perpendicular to a direction of motion of the sealing tool inner part; and
    the sealing tool inner part has a surface located between the second holding region and the gap, wherein the surface extends in a plane substantially perpendicular to the direction of motion of the sealing tool inner part.

2. The sealing tool according to claim 1 wherein the sealing tool inner part has an outer contour, and the seal comprises a shape congruent to the outer contour of the sealing tool inner part.

3. The sealing tool according to claim 1 wherein the seal is expandable starting from an unstressed condition.

4. The sealing tool according to claim 1 wherein the seal comprises silicone.

5. The sealing tool according to claim 1 wherein the seal has a constant width.

6. The sealing tool according to claim 1 wherein the second holding region is offset inwardly with respect to an inner edge of the gap on the sealing tool inner part.

7. A packaging machine comprising a sealing tool according to claim 1.

8. A sealing tool for a packaging machine, the sealing tool comprising:
    a sealing tool outer part;

a sealing tool inner part that is movable in the sealing tool outer part; and a seal provided between the sealing tool outer part and the sealing tool inner part, the seal having a flat, annular shape and being fixed in a first holding region at the sealing tool outer part and a second holding region at the sealing tool inner part, the second holding region being disposed at or in the proximity of an outer edge of the sealing tool inner part;

wherein a gap is provided between the sealing tool outer part and the sealing tool inner part, and the first holding region is offset outwardly with respect to an outer edge of the gap; and wherein the sealing tool inner part includes a surface extending between the second holding region and the gap in a plane substantially perpendicular to the direction of motion of the sealing tool inner part.

9. A sealing tool for a packaging machine, the sealing tool comprising:

a sealing tool outer part;

a sealing tool inner part that is movable in the sealing tool outer part; and a seal provided between the sealing tool outer part and the sealing tool inner part, the seal having a flat, annular shape and being fixed in a first holding region at the sealing tool outer part and a second holding region at the sealing tool inner part, the second holding region being disposed at or in the proximity of an outer edge of the sealing tool inner part;

wherein the first and second holding regions each comprise a groove that receives a portion of the seal; and wherein the sealing tool inner part includes a surface extending between the second holding region and the outer edge in a plane substantially perpendicular to a direction of motion of the sealing tool inner part.

10. A sealing tool for a packaging machine, the sealing tool comprising:

a sealing tool outer part;

a sealing tool inner part that is movable in the sealing tool outer part; and a seal provided between the sealing tool outer part and the sealing tool inner part, the seal having a flat, annular shape and being fixed in a first holding region at the sealing tool outer part and a second holding region at the sealing tool inner part, the second holding region being disposed at or in the proximity of an outer edge of the sealing tool inner part;

wherein a gap with a gap width is provided between the sealing tool outer part and the sealing tool inner part, and the first holding region and the second holding region are spaced further apart than the gap width in a projection on a plane perpendicular to a direction of motion of the sealing tool inner part;

wherein a bevel or step is provided between at least one of the two holding regions and the gap; and wherein the bevel or step is provided between the first holding region and the gap, and the sealing tool inner part is movable to an end position in which a surface of the sealing tool inner part extends continuously with a surface of the bevel or step.

11. The sealing tool according to claim 10 wherein the seal remains spaced apart from the bevel or step in each position during movement of the sealing tool inner part.

12. The sealing tool according to claim 10 wherein the sealing tool inner part is movable between first and second positions, and wherein the seal is spaced apart from the bevel or step when the sealing tool inner part is in the first position, and the seal contacts the bevel or step when the sealing tool inner part is in the second position.

13. The sealing tool according to claim 10 wherein a rounded edge is provided between at least one of the two holding regions and the gap.

* * * * *